United States Patent [19]
Neubert

[11] 3,726,309
[45] Apr. 10, 1973

[54] SCREW PISTON FEED DEVICE
[75] Inventor: Willi Neubert, Meinerzhagen, Germany
[73] Assignee: Gebruder Battenfeld, Meinerzhagen/Westphalia, Germany
[22] Filed: Feb. 3, 1971
[21] Appl. No.: 112,270

[30] Foreign Application Priority Data
　　Feb. 3, 1970　Germany..............P 20 06 389.2

[52] U.S. Cl..............................137/528, 251/324
[51] Int. Cl..........................F16k 15/00, F16k 17/00
[58] Field of Search.................18/30 SQ, 30 SR, 18/30 SM, 12 SE; 204/329; 425/207–209, 244, 245, 242, 252, 251, 247; 251/324; 137/528

[56] References Cited
UNITED STATES PATENTS

| 3,131,433 | 5/1964 | Volland | 18/30 SQ |
| 3,007,202 | 11/1961 | Wucher | 18/30 SQ |
| 3,319,299 | 5/1967 | Kiraly | 18/30 SQ |

FOREIGN PATENTS OR APPLICATIONS

| 1,023,900 | 3/1966 | Great Britain | 18/30 SQ |

*Primary Examiner*—Robert D. Baldwin
*Assistant Examiner*—Michael O. Sutton
*Attorney*—Watson, Cole, Grindle & Watson

[57]　　ABSTRACT

The invention relates to non-return valves for screw pistons devices for extrusion moulding of plastic material, in which the material is in a first mode conveyed by the rotary movement and extrusion of the material takes place in a second mode by the axial movement of the screw; a non-return valve is provided which allows the material to pass during the first mode to the front end of the screw and in the second mode closes to prevent the compositions from being driven back down the screw, the valve being formed as a ring around the screw which rings is allowed limited axial movement but substantially no rotational movement, the valve ring when open, allowing a passage for the material between it and the screw shaft and when closing the ring moves relatively back on the screw shaft to seat on the shaft and close the passage.

7 Claims, 4 Drawing Figures

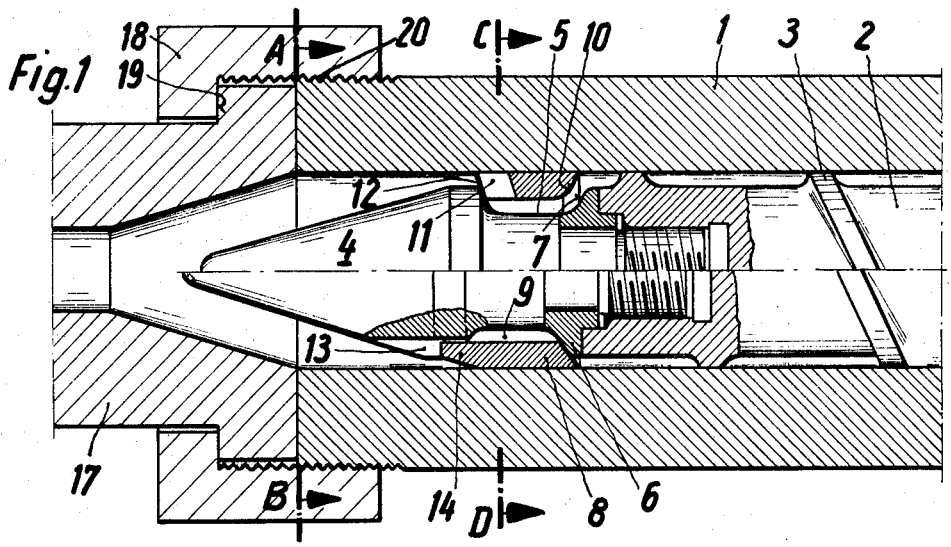
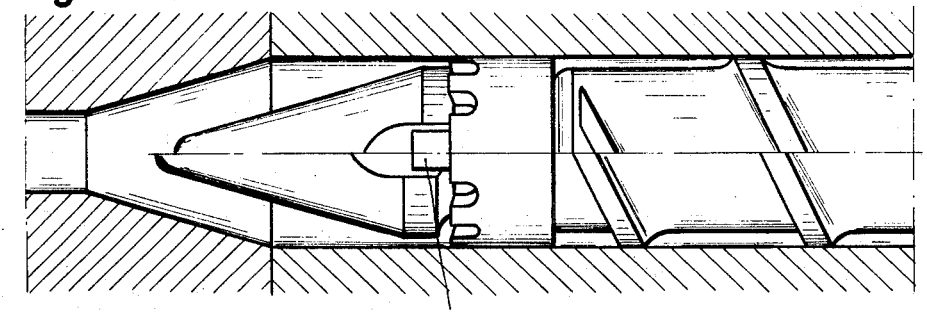
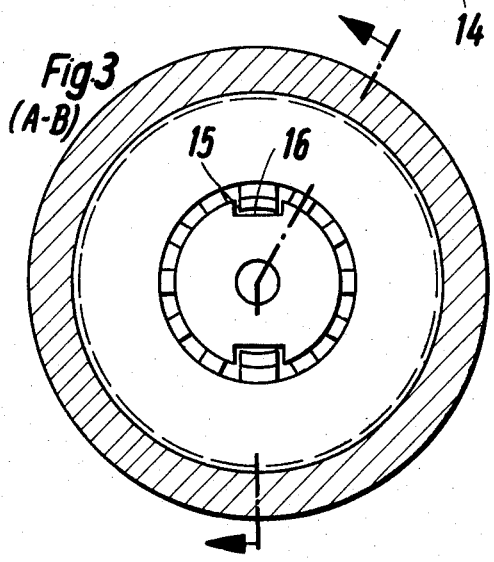
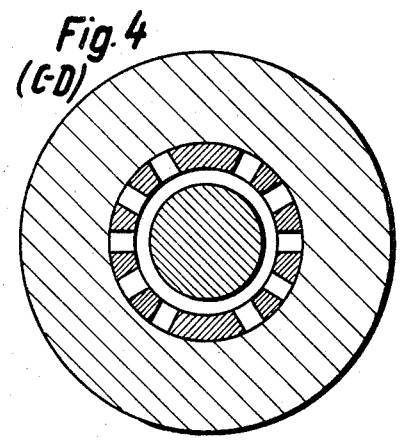

SCREW PISTON FEED DEVICE

The invention relates to a screw piston feed device with a non-return valve.

In such screw piston feed devices which are commonly used in machines for extruding plastics compositions, the compositions are conveyed by the rotary movement of the screw, the compositions being conveyed by the screw threads to in front of the screw tip; the compositions are extruded by a subsequent axial movement of the screw. When the extrusion stroke has taken place, the screw, accompanied by simultaneous extrusion, moves backwards and following return of the screw to its extreme rearward position, a fresh extrusion stroke occurs by axial displacement of the screw in a forwards direction. Such screw piston machines are suitable for extrudable plastics compositions plainly, for example for dough extruding machines in the bakery industry or, in a different field of application, for the processing of synthetic plastics, in which during rotation of the screw, the synthetic plastics granulate is simultaneously plasticized. In order on the one hand to ensure conveyance of the extrudable compositions in front of the screw point during rotation of the screw and on the other hand in order to carry out the extrusion stroke without the compositions conveyed in front of the screw tip being able to flow backwards, a non-return check is provided in the form of an axially freely movable barrier ring, the peripheral surface of which bears in sealing-tight manner on the screw cylinder which holds the screw. The barrier ring which is in the plastic range of the compositions, is axially freely movable and, during rotation of the screw, allows the compositions to pass in front of the screw tip and, during the extrusion process, prevents flow-back of the compositions by bearing sealingly on the screw. For this purpose, the end face of the barrier ring which is to the rear when viewed in the direction of conveyance, has a sealing face which, during the forwards stroke of the screw, abuts a corresponding sealing face on the screw, so that a flow-back of the composition which is in front of the screw tip and which is to be extruded is prevented. During rotation of the screw, the barrier ring moves forwards under the effect of the pressure of the compositions being conveyed, so that the extruded compositions can pass through a space left clear between the barrier ring and the screw and can pass through apertures or grooves in the barrier ring in front of the screw tip. These grooves or apertures which allow passage may also be disposed in the tip of the screw, in which case the barrier ring must be likewise disposed for axial displacement in the region of the screw tip.

These known barrier rings have in this respect a substantial disadvantage in that the screw is freely rotatable in relation to the barrier ring. Where the compositions are being conveyed by rotation of the screw, the barrier ring remains stationary by virtue of the friction arising from its sealing-tight abutment on the inner wall of the screw cylinder. Since the front end face of the barrier ring, due to the pressure of the conveyed compositions, bears with pressure on an abutment on the screw or screw tip which limits its axial travel, rotation of the screw and maintenance of the barrier ring stationary by friction result in wear on the abutment shoulders of the screw and/or the barrier ring which may be particularly considerable when grooves are disposed in the front end face of the barrier ring; in this case, the front end face of the stationary barrier ring which bears on the abutment on the screw tip acts like a mill, so that after a relatively short time the abutment on the screw tip is worn away to the extent that the barrier ring can pass over the tip of the screw. However, the function of the barrier ring is then no longer guaranteed; in addition, the screw tip has to be changed.

The application is based on the problem, where such screw piston machines equipped with a barrier ring are concerned, of avoiding the wear phenomena occuring with the prior art arrangement of the barrier ring and of extending the working life and hence the functional capacity of the apparatus.

According to the invention, this is achieved in that the barrier ring and the screw are connected to each other only in the direction of rotation. Due to this connection between barrier ring and screw, the barrier ring necessarily rotates with the screw during conveyance, so that wear can arise neither on the barrier ring nor on the screw or screw tip.

A further feature of the invention is characterized in that, on the barrier ring, there is a projection which engages into a groove-like recess in the screw or in that there is a projection on the screw which engages into a groove-like recess in the barrier ring, the length of engagement of the projection into the groove-like recess being greater than the maximum travel of the axial displacement of the barrier ring. A further feature of the invention resides in the fact that the projection and the barrier ring or screw are made in one piece. Furthermore, it is a feature of the invention that the groove-like recess and the projection engage into each other with clearance, the groove-like recess being so disposed that the compositions pass through it when they are being conveyed. By virtue of this construction of the projection and of the groove-like recess according to the invention, it is achieved on the one hand that during conveyance of the compositions, any harmful deposits inside the groove-like recess are avoided, since the compositions being conveyed constantly flush the groove-like recess and the projection. By reason of the fact that the projection and the barrier ring or the screw consist of one part, a weakening of the barrier ring or of the screw is avoided, which would necessarily occur if for example barrier ring and screw were joined together by a pin-member located transversely to the direction of conveyance. Apart from the resultant weakening of the barrier ring or screw, such a pin connection becomes sheared after prolonged operation times, so that the connection between screw and barrier ring no longer exists in the direction of rotation and once again, the disadvantages of the known barrier rings occur. In the case of the groove-like recess disposed according to the invention, and the projection engaging into such recess, such a weakening of the material is avoided and at the same time, the flow through the groove-like recess guarantees that the projection engages with clearance into the groove-like recess.

A further feature of the invention resides in the fact that the projection and the groove-like recess are slightly inclined to the axis of the screw in a direction opposite to the direction of the turns of the screw webs. In this case, it is essential that the total lateral clearance between the projection and the groove-like recess be equal to or greater than the value resulting from multiplication of the sine of the angle of inclination by the maximum travel of the barrier ring. By virtue of the inclination of the projection and of the groove-like recess according to the invention, it is ensured that upon rotation of the screw, the barrier ring bears on one inclined face of the groove-like recess while during axial displacement of the screw, it bears on the opposite face of the inclined groove-like recess. In consequence, material located between the side wall of the groove-like recess and the side wall of the projection bearing on it during rotation of the screw, is reliably removed during the subsequent axial movement of the screw, since the projection bears on the opposite side of the groove-like recess. In order to prevent a rotation of the screw during this change in bearing surfaces, the total lateral clearance must be so dimensioned that the barrier ring cannot rotate. This is achieved by the aforesaid measure according to the invention, so that the barrier ring is entrained during rotation of the screw but is merely displaced axially and with no rotary movement during the screw stroke.

Finally, it is of importance that additional per se known apertures or grooves be provided in that part of the barrier ring which is towards the tip of the screw, to allow passage for the compositions. Such apertures or grooves are known per se and in the embodiment according to the invention, they serve to guarantee trouble-free conveyance of the compositions in front of the screw tip during its rotation, without material becoming deposited on the barrier ring, it being possible for such deposits to cause burning of material or streaks in the finished part, particularly where plastics compositions are being processed.

By way of example, an embodiment of the invention is illustrated in the attached drawings, in which:

FIG. 1 is a cross-section through the non-return lock, the screw being in the conveying position in the top and in the stroke position in the bottom;

FIG. 2 is a view according to FIG. 1, showing the conveying position in the top part and the stroke position in the bottom part;

FIG. 3 is a section taken along the line A–B in FIG. 1 and

FIG. 4 is a section taken along the line C–D in FIG. 1.

As the drawings show, the screw 2 is disposed in the cylinder 1. The screw 2 has helically extending screw webs 3 which bear on the inner wall of the screw cylinder 1 and transport forwards the material which is fed to the screw. At the forward end of the screw 2 is a conically tapering screw tip 4 which is secured in an axial position by bolts, the screw having behind its conical part a cylindrical recess 5 which merges into a projecting ring 6 which has a sealing shoulder 7. Disposed in the region of the recess 5 in the screw tip 4 is a barrier ring 8, the outer peripheral surface of which bears in sealing-tight manner on the inside wall of the screw cylinder and which is axially movable within the recess; as can be seen from FIG. 1, there is between the barrier ring 8 and the recess 5 of the screw tip 4 an annular space 9 through which the composition transported forwardly by the screw webs 3 can pass after displacing the barrier ring 8 into the position shown at the top of FIG. 1. The barrier ring 8 has a sealing surface 10 corresponding to the sealing shoulder 7 of the projecting ring 6; during the stroke of the screw 2, as the bottom part of FIG. 1 shows, the sealing faces 10 and 7 bear on each other so that the composition cannot flow back out of the space located in front of the screw tip 4. In its end face which is towards the screw tip 4, the barrier ring 8 has through-flow grooves 11 through which the composition transported during rotation, according to FIG. 1 (top) can pass from the screw 2 through the annular space 9, through the grooves 11 and in front of the screw tip 4. The transition surface from the screw tip 4 to the recess 5 forms the abutment shoulder 12 for the forward position of the barrier ring 8 during rotation of the screw.

In order to entrain the barrier ring 8 during rotary movement of the screw 2, two diametrically opposed groove-like recesses 13 are provided and the surface of the conical tip 4 of the screw, while on the front end face of the barrier ring 8 there are projections 14 which consist of one piece with the barrier ring 8 and engage into the groove-like recesses 13 of the screw tip 4. The length of engagement of the projections 14 is greater than the maximum axial displacement of the barrier ring in the cylindrical recess 5. The projection 14 lies in the groove-like recess 13 with a lateral clearance 15 and a radial clearance 16, as shown particularly in FIG. 3. Adjacent to the screw cylinder 1 is the cylinder head 17 which contains the injection nozzle, not shown, and which is connected to the screw cylinder 1 by a cap nut 18. For this purpose, the cylinder head 17 has an abutment shoulder 19 over which the cap nut 18 engages. Provided on the screw cylinder is an external screw threading 20 so that the cap nut 18 connects the cylinder head 17 to the screw cylinder 1 by being screwed onto the screw threading.

The non-return check functions in the following manner. Upon the rotation of the screw illustrated in the upper parts of FIGS. 1 and 2, the composition is conveyed by the screw through the annular space 9 via the grooves 11 and also via the groove-like recesses 13 in front of the screw tip 4, the composition being passed through the gap between the groove-like recess 13 and the projection 14 by the lateral clearance 15 and radial clearance 16, so that upon rotation of the screw, the composition is passed both through the grooves 11 and also through the groove-like recesses 13 to a place in front of the screw tip 4. The projections 14 on the barrier ring 8, which engage into the groove-like recesses 13 reliably entrain the barrier ring 8 during rotation of the screw. During the axial displacement of the screw 2 for ejecting the composition, the barrier ring 8 moves up to the sealing shoulder 7, the projection 14 remaining in the region of the groove-like recess 13. Upon rotation of the screw, the upper lateral face of the barrier ring 8 which is inclined slightly towards the screw axis bears on the adjacent lateral face of the groove-like recess 13, while during the travel of the screw, the projection 14 is maintained bearing on the opposite lateral face of the groove-like recess 13, the overall lateral clearance between the projection 14 and the groove-like recess 13 being so dimensioned that no rotation of the barrier ring 8 takes place during this change of abutment.

I claim:

1. A screw piston feed device for feeding material to an extrusion head comprising a screw arranged to be rotated to feed the material up the screw to the end of the screw, said screw further arranged to be moved axially so as to act as a piston and feed the material at the end of the screw to the extrusion head, a ring shaped non-return valved mounted on the screw coaxially therewith, said valve having a passage therethrough to allow the material to be fed by the screw through the valve to the extrusion head, said valve having forward and rearward faces and having a seating on its rearward face adapted to seat on a cooperating seating on the screw whereby material fed to the extrusion head is prevented from returning down the screw on the axial feeding movement of the screw, when acting as a piston, said non-return valve being provided with means for insuring its rotation with the screw.

2. A screw piston as claimed in claim 1 wherein the means for ensuring rotation with the screw comprises a projection on the valve ring adapted to cooperate slidingly with a groove in the screw, the engageable length of the groove being longer than the maximum axial displacement of the valve.

3. A screw piston as claimed in claim 1 wherein the means for ensuring rotation with the screw comprises a projection on the screw adapted to cooperate slidingly with a groove in the valve ring.

4. A screw piston as claimed in claim 2 wherein the groove and the projection engage one another with clearance whereby the clearance provides a path through which the material can pass when the material is being fed by the screw.

5. A screw piston as claimed in claim 2 wherein the projection and groove are slightly inclined to the axis of the screw in a direction opposite to the direction of turn of the screw webs.

6. A screw piston as claimed in claim 5 wherein the total lateral clearance between the projection and the groove is equal to or greater than the value given by the multiplication of the sine of the angle of the inclination by the maximum travel of the valve ring.

7. A screw piston as claimed in claim 1 wherein that part of the valve ring which is towards the screw tip has additional passages for the material.

* * * * *